Nov. 8, 1932.    J. M. CRAIGO    1,886,872
DENTAL IMPRESSION DEVICE
Filed Nov. 9, 1929    2 Sheets-Sheet 1
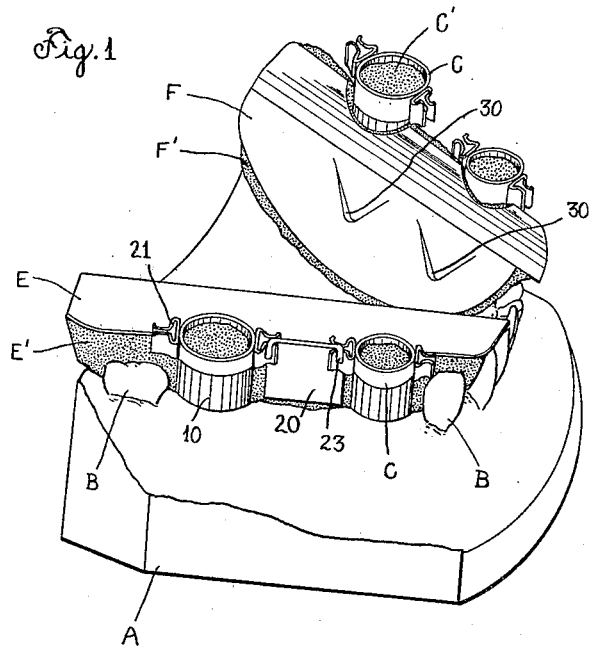
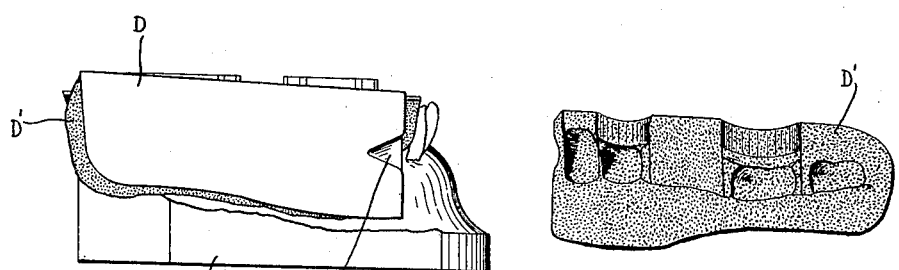
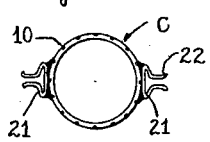
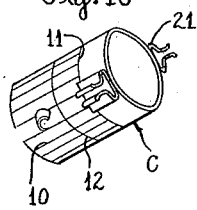
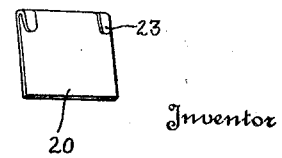
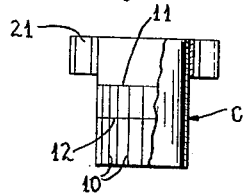
Inventor
John M. Craigo
By T. Clay Lindsey
his Attorney Nov. 8, 1932.     J. M. CRAIGO     1,886,872
DENTAL IMPRESSION DEVICE
Filed Nov. 9, 1929     2 Sheets-Sheet 2
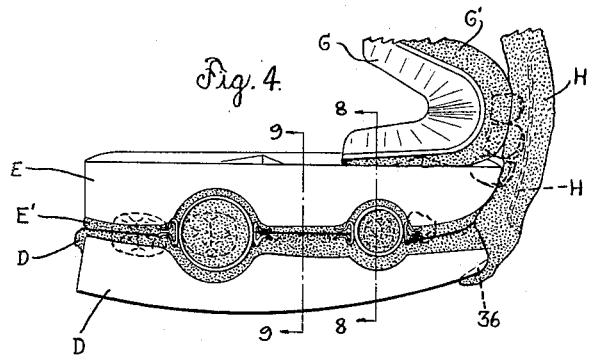
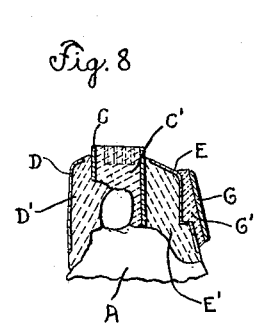
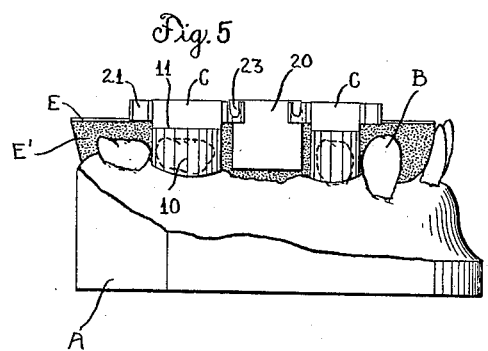
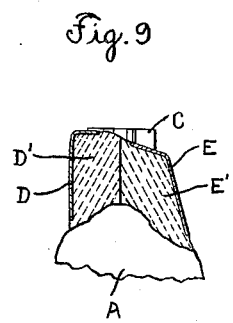
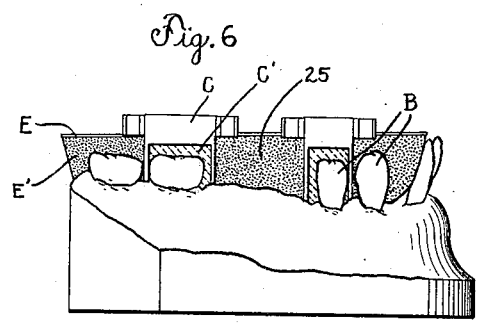
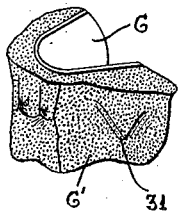
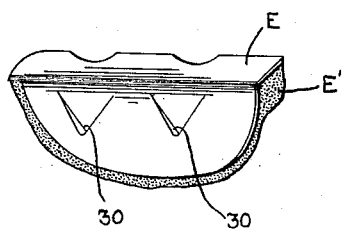
Inventor
John M. Craigo
By T. Clay Lindsey
his Attorney Patented Nov. 8, 1932

1,886,872

UNITED STATES PATENT OFFICE

JOHN M. CRAIGO, OF HARTFORD, CONNECTICUT

DENTAL IMPRESSION DEVICE

Application filed November 9, 1929. Serial No. 406,024.

This invention relates generally to dentistry, and has particular reference to that part of the art pertaining to the taking of impressions of the gums and teeth of the mouth.

It has been the practice, in taking an impression of an individual tooth, to slip a tube containing a material in plastic condition over the tooth and then let the plastic harden. Considerable difficulty, however, has been experienced in obtaining the proper impression in the plastic, particularly in the case of crooked or bulbous teeth, because the plastic would set in the undercuts making it impossible, in many instances, to withdraw the tube and the plastic therein from the tooth without damaging or distorting the impression. It has also been proposed to take an impression in this manner by first cutting away a portion of the side of the tube, but this procedure is objectionable in that the plastic is not properly confined and, therefore, during the operation of taking the impression, the plastic is not compressed in the tube, resulting in a faulty impression.

The aim of the present invention is to provide an improved tube by means of which the above and other objections and disadvantages incident to tubes and practices as heretofore employed are eliminated or, to a large extent, avoided.

A further aim of the invention is to provide a tube by means of which an impression of a tooth may be taken with greater rapidity and facility and a more accurate impression is obtained while, at the same time, the tube, together with the impression therein, may be readily removed from and replaced upon the tooth as occasion may arise. To these ends, I provide an improved tube having its wall portion which surrounds the tooth so constructed that portions thereof may be easily removed or stripped away to any desired extent after the impression has been taken so as to allow removal of sufficient plastic material to release the impression from the tooth. In the particular form shown in the accompanying drawing, the tube is provided with longitudinally extending lines of weakness which may be obtained by scoring the metal, thus providing, between score lines, strips which may be readily removed, there being, by preference, one or more circumferential lines of weakness or score marks for defining the extent or extents to which the longitudinally extending strips may be removed.

A further aim of the invention is to provide an improved arrangement by means of which sectional impressions may be very easily, quickly and accurately taken.

A further aim of the invention is to provide an improved arrangement wherein the various parts of the sectional impression may be very accurately and readily positioned in the proper relation with respect to one another.

Other objects will be in part obvious and in part pointed out more in detail hereinafter.

The invention accordingly consists in the features of construction, combination of elements and arrangements of parts which will be exemplified in the construction hereinafter set forth and the scope of the application of which will be indicated in the appended claims.

In the accompanying drawings, wherein I have shown the various improvements of my invention:

Figure 1 is a perspective view of a full jaw and to which is applied individual tubes and sectional impression members;

Fig. 2 is a side elevational view showing the outside sectional impression unit which is complemental to the inside impression unit shown in the lower half of Fig. 1;

Fig. 3 is an inside view of the impression unit shown in Fig. 2;

Fig. 4 is a plan view of a portion of the jaw and shows the front outside impression unit and the front inside impression unit;

Fig. 5 is a side view of the jaw member with certain of the impression members in place;

Fig. 6 is a view similar to Fig. 5 but showing portions of the individual tubes stripped to expose portions of the teeth housed by the tubes;

Fig. 7 is a perspective view of the sectional tray E;

Fig. 8 is a sectional view taken on line 8—8 of Fig. 4;

Fig. 9 is a sectional view taken on line 9—9 of Fig. 4;

Fig. 10 is a perspective view of the inside front impression unit;

Fig. 11 is an end view of one of the tubes;

Fig. 12 is a side view thereof with parts broken away;

Fig. 13 is a perspective view thereof; and

Fig. 14 is a perspective view of a shim or baffle.

Referring to the drawings in detail, A represents generally, and somewhat diagrammatically or conventionally, the jaw of a person; and B, the natural teeth. C designates generally the tubes within which impressions of individual teeth are taken. D is the outside right hand impression tray; E, the inside right hand impression tray; F, the inside left hand impression tray; G, the inside front impression tray; and H, the front outside impression tray. The impression material within these respective trays is indicated by like reference numerals which are primed. The impression or plastic material within the tubes C is designated by the letter C'.

Each of the tubes C is preferably in the form of a cylindrical member of thin metal having a continuous circumferential wall, one end of the tube having longitudinally extending lines of weakness 10 which are spaced apart at suitable distances so as to provide, between these lines, strips or portions which may be easily removed, either one separately or a plurality of them together. These lines of weakness may be formed in any suitable manner but, by preference, they are made by impressing, cutting into, or rolling into the wall of the tubes grooves or score lines. The upper or outer end of the tube is preferably unscored and, in order to limit the extent to which the tubes may be stripped and to permit the portions of the tubes, between the longitudinal score lines, to be readily broken off from the top of the tube, there is provided a circumferential line of weakness 11 which also may be formed by grooving or scoring the tube. In some instances, it may be desirable to strip or remove the longitudinal portions for different distances and, to facilitate this, the tube may have two or more circumferential lines of weakness longitudinally spaced apart. In Fig. 12, I have indicated an additional line of weakness 12.

When it is desired to take an impression of an individual tooth, a tube is filled with a material in plastic form and then the tube is slipped down over the tooth and an impression of the tooth is formed in the plastic material. In this operation, the plastic material is confined within the tube so that the necessary pressure may be placed upon the plastic material to insure a proper impression and a proper compacting of the impression material. The plastic material is now permitted to harden. In this condition, the tube cannot ordinarily be withdrawn from the tooth because the tooth is undercut, or has a restricted neck, so to speak. To permit withdrawal of the tube, together with the plastic material therein, from the tooth, portions of the scored part of the tube are stripped away or removed so that access may be had to the plastic material for the purpose of cutting away so much of that plastic material as anchors the impression to the tooth; that is to say, a portion of the plastic material to one side of the tooth is removed from the under-cut portions of the tooth. In stripping away portions of the tube, this may be readily done by merely inserting a tool under the lower end of one of the longitudinal strips and then curling that strip, as shown most clearly in Fig. 13. When the strip has been curled or stripped up to a circumferential line of weakness 11 or 12, as the case may be, the strip may be readily broken off. Any number of these longitudinally extending strips may thus be removed until the desired portion of the plastic is exposed. Then, as stated, a portion of the plastic C' may be removed. The tube, together with the impression, may now be lifted off of the tooth. The tube, together with the plastic material, may be readily placed on and taken off of the tooth as subsequent operations may demand. In the event that only an impression of a single tooth is to be taken, the tube may be repositioned upon the tooth and then a material in plastic form, positioned in the cutaway portion of the tube thus obtaining a complete impression.

In accordance with the present invention, the arrangement is such that, with the tube or tubes C in place, impressions of the adjacent gum or adjacent teeth, or both, may be obtained. For example, it may be desired to take individual impressions of two teeth between which the other teeth are missing and also to take sectional impressions of that side of the jaw in which the two teeth are located. In taking the general impressions, it may be desired to take one side, say the inside impression, first, and then the outside impression. Heretofore, in taking one sectional impression, the plastic material has been put into a tray and then the plastic material pressed against one side of the jaw, say the inside, with the result that the plastic material ran into the spaces between the teeth. Then, after the plastic material was hardened, the overflow portions of the plastic material were trimmed away, an operation which required time and resulted in various faults. Then the other side of the impression was taken. In accordance with the present invention, I provide an arrangement for defining the meeting wall of the first general impression which is made; that is, I provide means for limiting the extent to which the impression material may flow between the teeth, and this means is preferably carried by and located on the tubes. In the specific embodiment shown in the drawings, 20 designates a baffle or fin which is adapted to bridge or substantially close the space between the tubes C, this baffle being suitably supported by the tubes and held in place thereby. Any suitable arrangement for connecting the baffle or connecting the baffles, as the case may be, to the tube or tubes may be employed, but, by way of example, I have shown the tubes provided with clips 21. Each of these clips is generally of U-shape construction, the central portion being secured to the wall of the tube by solder, riveting, or in any other suitable manner. The wings or arms of the clips are so bent as to provide a space between them which is substantially as wide as the thickness of the baffle 20. By preference, the ends of the arms of the clips are bent outwardly as at 22 so as to provide a tapered throat which will permit ready insertion of the edge of the baffle between the arms. The baffle has, at the opposite corners of one edge, overturned ears 23 which are adapted to hook over arms of the clips. In the accompanying drawings, I have shown but one baffle, but the tubes are shown as having clips at opposite sides so that a baffle may be connected to each side of each tube.

With the construction so far described, the impressions within the individual tubes C are formed and the portions of these tubes and the plastic therein are cut away, as previously stated. The tubes are positioned upon the teeth and then the baffle is supported between the tubes. The baffle may be bent so that its lower edge registers with the ridge of the gum therebeneath. Then impression material E' in plastic state is placed within the tray E and the plastic material is pressed against the inside of the jaw. The plastic material will flow about and take the shape of the tubes and the inside of the teeth and jaw, and between the tubes the plastic material will be confined by the baffle 20. In other words, this baffle will form a flat vertical surface 25 on the plastic material E', thus eliminating the tedious operation of trimming that portion of the plastic material while, at the same time, the impression material is condensed to a greater extent than would be the case if the impression material were permitted to flow unconfinedly into the space between the teeth. After the plastic material E' is hard, the tray E with the impression material therein is removed, the shim or baffle 20 is taken away, and the outer face of the impression material E' is greased or lubricated so that the plastic material of the outer impression will not stick thereto when this outer impression is made. The parts are now re-assembled, as shown in Fig. 6, a material D' in plastic condition is put in the outside sectional tray D, and then the material D' is positioned and pressed against the outside of the jaw. This impression material D will take impressions of the exposed portions of the teeth and will flow up against the outside of the impression material E'. After the impression material D' is hardened, the parts may be taken apart.

As previously stated, a further feature of the invention is the provision of means for accurately locating the sectional impressions on one side of the teeth relative to one another. This feature will now be described more in detail in connection with the impression units F and G, it being obvious that other units may be relatively and accurately positioned in the same manner. The side wall of the tray F is provided with one or more V-shaped recesses 30 which may be formed by drawing the metal in the manner illustrated. These V-shaped recesses gradually increase in depth towards their apexes. Incidentally, these recesses form internal V-shaped ribs or projections which assist in anchoring the material F' to the tray F. The tray E is provided with corresponding recesses 30. After the trays E and F have been positioned, as shown in Fig. 1, an impression of the inside of the front teeth may be taken by placing a material G' in plastic form in front inside tray G and then this material G' is forced against the inside of the front teeth and against the inside surfaces of the trays E and F. The material G' will flow into the forward recesses 30 so that there is formed on the impression material G' V-shaped ribs 31 which correspond to and fit accurately in the recesses 30. After the material G' is hardened, the tray G, together with the impression compound carried thereby, may be readily removed. It will be clear that, if the parts are separated and re-assembled, the impression unit G will always have the same relation to the trays E and F because of the registry of the ribs 31 in the grooves 30. Owing to the shape of the recesses 30 and the ribs 31, the unit G may be readily removed irrespective of the inclination of the trays or of the front teeth. The element G can just as readily be repositioned in place.

In order to accurately position the front impression unit H with respect to the side impression unit D, the tray D has, at its forward end, a V-shaped recess 35 in which the material H' is adapted to flow while an impression of the front side of the forward teeth is being taken. This rib 36 thus formed on the impression material H' will, of course, correspond in shape to the recess 35 so that the parts may be accurately positioned relative to one another.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that that language used in the following claims is intended to cover all of the generic and specific features of the invention herein described and all statements of the scope of the invention which, as a matter of language, might be said to fall therebetween.

I claim as my invention:

1. In the art of dentistry, an article of manufacture comprising a metal tube having a plurality of spaced apart score lines extending longitudinally from one end of the tube and only partially through said tube, said tube having a circumferential line of weakness.

2. In the art of dentistry, an article of manufacture comprising a thin metal tube having a plurality of longitudinally extending lines of weakness starting at one end of the tube, and a plurality of longitudinally spaced apart circumferential lines of weakness, said lines of weakness extending only partially through the wall of said tube.

3. In the art of dentistry, a tube adapted to fit about an individual tooth and in which an impression is adapted to be taken, a part connected to the upper end of said tube, and a baffle plate having a portion adapted to cooperate with said part for locating said baffle plate with respect to said tube.

4. In the art of dentistry, a tube adapted to fit about a tooth and in which an impression is adapted to be taken, said tube having a wing extending radially therefrom, and a baffle plate having an overturned ear adapted to hook over said wing.

5. In the art of dentistry, a tube adapted to fit over a tooth and in which an impression is adapted to be taken, said tube having secured thereto a clip provided with a pair of arms, and a baffle member having an edge adapted to fit between said arms and provided with an ear adapted to hook over one of said arms.

6. In the art of dentistry, a tube adapted to fit over a tooth and having a clip provided with a pair of arms, the outer ends of which flare outwardly so as to provide a throat, and a baffle member adapted to fit between said arms and having a part adapted to slidably interlock therewith.

7. In the art of dentistry, an impression taking tube, comprising a substantially cylindrical body portion having a continuous and uninterrupted inner wall and provided in its exterior surface with a plurality of spaced lines of weakness admitting of the removal from and defining in the tube body longitudinal strips for releasing the tube after the impression has been taken.

8. In the art of dentistry, an impression taking tube, comprising a thin metal substantially cylindrical body portion adapted to receive impression material for engagement over a tooth, said body portion having an uninterrupted and smooth inner surface for contact with the impression material and having at its inner end a plurality of longitudinally extending spaced apart score lines in its exterior surface providing lines of weakness upon which the material of the tube may be separately removed in strip form for releasing the tube after the impression has been taken.

9. In the art of dentistry, an impression taking tube, comprising a substantially cylindrical body portion having a smooth interior surface adapted to receive impression material thereagainst and having in its outer side spaced longitudinal and circumferentially extending lines of weakness defining integrally connected removable sections for the body portion of the tube to admit the removal thereof subsequent to the taking of an impression.

JOHN M. CRAIGO.